(12) United States Patent
Jacobson

(10) Patent No.: US 8,474,778 B2
(45) Date of Patent: Jul. 2, 2013

(54) ADJUSTABLE HANDS-FREE MOUNTING APPARATUS FOR TABLET PERSONAL COMPUTERS

(76) Inventor: Stephen R. Jacobson, Miami Beach, FL (US)

( * ) Notice: Subject to any disclaimer, the term of this patent is extended or adjusted under 35 U.S.C. 154(b) by 0 days.

(21) Appl. No.: 13/220,309

(22) Filed: Aug. 29, 2011

(65) Prior Publication Data

US 2013/0048809 A1   Feb. 28, 2013

(51) Int. Cl.
*A47G 1/16* (2006.01)
(52) U.S. Cl.
USPC ........ 248/492; 248/206.2; 248/495; 248/448; 40/617
(58) Field of Classification Search
USPC .............. 248/206.2, 453, 445, 451, 488, 492, 248/495, 496; 40/617
See application file for complete search history.

(56) References Cited

U.S. PATENT DOCUMENTS

| | | | | |
|---|---|---|---|---|
| 1,187,845 A * | 6/1916 | Kolb | ............................ | 248/102 |
| 3,140,558 A * | 7/1964 | Cassidy | ........................ | 248/449 |
| 3,986,649 A * | 10/1976 | Heimstra | ..................... | 224/567 |
| 4,101,107 A * | 7/1978 | Antoszewski | ............. | 248/218.4 |
| 4,294,425 A * | 10/1981 | Weber | .......................... | 248/445 |
| 4,472,897 A * | 9/1984 | Phillips | .......................... | 40/352 |
| 5,316,256 A * | 5/1994 | Siebenaler et al. | ........... | 248/453 |
| 5,356,061 A * | 10/1994 | Yu | ................................. | 224/275 |
| D393,132 S * | 3/1998 | Baker | ........................... | D34/27 |
| 5,768,828 A * | 6/1998 | Wilson | ........................... | 49/386 |
| 5,813,354 A * | 9/1998 | Scott | .............................. | 108/44 |
| 5,893,543 A * | 4/1999 | Emery et al. | ............... | 248/205.5 |
| 5,984,347 A * | 11/1999 | Blanc-Rosset | ............... | 280/727 |
| 6,021,911 A * | 2/2000 | Glickman et al. | ............ | 212/345 |
| 6,105,839 A * | 8/2000 | Bell | ............................... | 224/275 |
| 6,147,435 A * | 11/2000 | Fujimura | ...................... | 310/317 |
| D478,634 S * | 8/2003 | Whitworth et al. | ............ | D20/43 |
| 6,607,241 B2 * | 8/2003 | Johnston | .................. | 297/188.06 |
| 6,637,714 B1 * | 10/2003 | Hall | ........................... | 248/444.1 |
| 6,830,292 B1 * | 12/2004 | Yoda | ........................ | 297/188.06 |
| 7,032,872 B2 * | 4/2006 | Sullivan | ................... | 248/346.07 |
| 7,086,190 B2 * | 8/2006 | Voluckas | ........................ | 40/617 |
| 7,568,915 B1 * | 8/2009 | Lavoie | .......................... | 434/408 |
| 7,611,112 B2 * | 11/2009 | Lin | ............................. | 248/274.1 |
| 7,628,717 B2 * | 12/2009 | Purcell et al. | .................. | 473/483 |
| 7,640,633 B2 * | 1/2010 | Chou | ............................... | 24/68 E |
| D653,066 S * | 1/2012 | Henderson | ...................... | D6/553 |
| 8,091,486 B1 * | 1/2012 | Broaddrick | ..................... | 108/43 |
| 2008/0029663 A1 * | 2/2008 | Derry et al. | ................ | 248/178.1 |
| 2009/0050758 A1 * | 2/2009 | Carnevali | ................... | 248/205.8 |
| 2011/0009164 A1 * | 1/2011 | Amiri | ........................ | 455/556.2 |
| 2012/0187257 A1 * | 7/2012 | Zou | ............................. | 248/125.8 |

\* cited by examiner

*Primary Examiner* — Terrell McKinnon
*Assistant Examiner* — Daniel J Breslin
(74) *Attorney, Agent, or Firm* — Ian P. Coyle

(57) ABSTRACT

The invention provides an apparatus for adjustably mounting a tablet PC, portable personal computer, or flat panel video display, which is particularly suited for use during travel and in rugged conditions. The apparatus enables stable and versatile emplacement of a tablet PC by incorporating multiple independent adjustment and attachment elements. A mounting means, such as a suction cup assembly, is attachable to various surfaces and is connected to a hanger from which cordage or straps descend to a suspended frame. The frame features clips, resilient spacers, and adjustable dimensions to securely hold any commercially available tablet PC therein. The frame may further comprise various swappable stabilizer elements to separately regulate the orientation and attachment of the tablet PC to a surface. In a preferred embodiment, the apparatus is mounted to a windshield and the frame positions the tablet PC over the center console in an automobile.

8 Claims, 16 Drawing Sheets

ADJUSTABLE HANDS-FREE MOUNTING APPARATUS FOR TABLET PERSONAL COMPUTERS

BACKGROUND OF THE INVENTION

1. Field of the Invention

The present invention relates to an apparatus for adjustably mounting a tablet PC or portable personal computer for hands-free emplacement in a diverse range of environments. More particularly, the apparatus of the present invention attaches to various surfaces via a mounting means that is flexibly connected to a separately adjustable frame for holding a tablet PC, where the ultimate emplacement of the tablet PC is finely regulated via multiple, independently adjustable features of the apparatus. The apparatus enables stable and precise positioning of any tablet PC on even the most unsteady and irregular substrates, providing exceptional utility during vehicular travel, natural disasters, crowded public events, and other harsh conditions.

2. Description of the Related Art

The following review of related art is intended to provide edifying examples of problems and pitfalls in the design and use of personal computer mounting apparatuses. No admission is made that any reference, including any patent or patent document, cited in this specification constitutes prior art with respect to the present invention. Applicant reserves the right to challenge the accuracy and pertinence of any of the documents cited herein.

The "tablet PC" is a portable personal computer (PPC) generally characterized by a prominent touch-screen interface and a thin rectangular geometry that is rapidly becoming the preferred personal digital accessory (PDA) among consumers. Tablet PCs emphasize the capacity for powerful full-range personal computing and necessarily possess larger dimensions and heavier weights than prior PDAs, which generally comprise cellular phones, music players, digital cameras, or GPS navigators. The PDAs in the prior art prioritize their respective consumer electronics functions and marginalize personal computing capacity, placing a premium on achieving miniaturization rather than versatility. Although these distinctions are merely trends and not rules, and are not intended to limit the scope of the present invention, they are manifested in the failure of prior art PDA mounting devices to accommodate the substantially greater bulk and weight of tablet PCs. Prior art mounting apparatuses are too fragile for, too unstable for, and fundamentally incompatible with tablet PCs and related PPCs.

A popular solution to the mounting requirements of tablet PCs in a stationary environment on a horizontal surface is disclosed in U.S. Pat. No. 7,969,732 to Noble. The Noble device comprises a groove in a pedestal which receives an edge of a tablet PC, holding it upright by action of gravity alone. Although convenient and rapidly assembled, the Noble device provides no stabilizing function to hold the mounted tablet PC in a moving environment, i.e., during travel, or upon a non-horizontal surface. U.S. Pat. No. 5,607,135 to Yamada presents a similar tablet stand concept having an adjustable angle of support, but which is still susceptible to dislodgment during travel-associated movement.

The particular difficulty of mounting a tablet PC in a moving vehicle is expressed in the elaborate solution proposed in U.S. Pat. App. No. 2011/0114686 to Franzi. The Franzi invention resembles a child safety chair, occupying an entire passenger seat in a vehicle, having a swiveling armature for bolting or engaging the back of a tablet PC or other portable computer. Although secure against lateral motion and hard-braking, the Franzi invention occupies an excessive amount of space inside the travel compartment and requires a driver to look away from the road in order to view the screen.

U.S. Pat. No. 7,861,985 to Galvin discloses an apparatus for securing small, lightweight PDAs to various surfaces, the apparatus comprising a mounting means in the form of a common spring clip that is in turn connected by a flexible gooseneck to a universal belt clip that attaches to the PDA. Although the Galvin invention is heralded as a travel accessory, the security of the mounting attachment is dependent upon the grip of the spring clip, which is notorious for slipping off of surfaces unless the surfaces possess precisely square, non-slippery, protruding edges less than about 2-3 inches wide. Such surfaces are rarely present inside automobiles, airplanes, buses, and most other common means of travel. Instead, the Galvin invention in practice must be clipped to the curvy plastic surfaces of dashboards, consoles, meal trays, or arm-rests which are almost always coated in some form of slippery organic solvent or substance and further destabilized by vibration and turbulence during travel. Another drawback of this invention is the obtrusiveness of the long gooseneck, which not only acts as a lever, placing greater destabilizing force upon the spring clip in proportion to the weight of the PDA mounted on its proximal end, but which also is not adjustable lengthwise, and therefore becomes an inconvenient obstacle, preventing access to the area behind the mounted computer and intruding undesirably into the interior of the cabin or space occupied by a traveling user. The Galvin device and the numerous related prior art devices discussed in the Galvin disclosure may be suitable for holding small music players or smart phones, but they cannot be reliably used for mounting a relatively large and heavy tablet PC of the types that predominate in the marketplace today, particularly inside a car or other moving vehicle.

Clips or frames attached directly to suction cups are the predominant method for reversibly mounting PDAs including GPS navigation devices in automobiles, and on non-horizontal surfaces. U.S. Pat. App. Pub. No. 2011/0073743 to Shamie describes a device virtually identical to the Galvin device except the spring clip has been replaced with a suction cup. U.S. Pat. App. Pub. No. 2010/0274483 to Wikel describes a suction cup that attaches to the inside of the windshield or to the top surface of a dashboard, accommodating a PDA via a connector adjacent to the suction cup. Neither of these prior art devices are suitable for holding a tablet PC because of its relatively large width and heavy weight compared to GPS devices and smart phones. With regard to travel use, the interior slope of the windshield in most cars limits the size of a mounted device to 3-4 inches if mounted above the dashboard, and the heavy weight of a tablet PC will overcome the strength of any gooseneck arm if extended horizontally away from the windshield into the passenger area beyond the dashboard.

Scant incentives exist for promoting the development of greater weight and size capacities in existing dashboard clips and windshield suction cup devices for good reason, because the bulk of heavier, larger devices such as tablet PCs would obscure a significant portion of a driver's view through the windshield, and when such bulky devices are extended by a gooseneck or other arm several inches into the passenger compartment in order to space them sufficiently far away from the windshield that they can present their screens vertically, they become a distracting and potentially dangerous physical obstruction. Consequently, most larger PPCs and video screens are installed permanently, and not removeably, in the center consoles of a dashboard, rear panels of a seatback, or panels attached to the ceiling.

U.S. Pat. No. 7,894,003 to Chang exemplifies the permanently mounted type of apparatus that is commonly used to hold computer devices and screens in the ceiling or seat-backs of vehicles ranging from automobiles to airplanes. Unfortunately, the Chang device and its related inventions are not adapted for portability or for reversible assembly, and therefore they are not amenable to a traveler who desires to quickly remove the screen and hardware components when exiting a vehicle or to quickly install them upon entering a vehicle. Furthermore, these mounting devices are not particularly suitable for touch-screen control since they are mounted overhead, beyond the comfortable reach of a seated person, or alternatively when they are mounted in a seatback, excluding access from the driver's seat and front passenger seat of a car, which is where the majority of consumers would prefer to have access to their tablet PCs while traveling.

Suction cup mounting devices which suspend any electronic device in front of a windshield present particular hazards to the passengers of the vehicle in the event of an accident. For example, U.S. Pat. No. 7,857,268 to Chiu provides a robust mounting apparatus for PDAs that contains a rigid metal frame suspended in a windshield by two suction cups. Not only does the Chiu invention significantly obstruct the view through the windshield, but also it represents a grave hazard if any accident should occur that resulted in the shattering of the windshield, which would dislodge the heavy metal mounting device and send it hurling through the passenger compartment at head-level.

As a result of the shortfalls in the prior art, an unmet need exists for an apparatus that permits the rapid, convenient, versatile, and finely adjustable emplacement of PPCs in diverse environments to enable convenient and reliable operation during travel, fieldwork, rescue operations, and other endeavors where a stable desklike surface is not likely to be available and where alternation between locations is expected. Any satisfactory solution to this unmet need requires that the screen of a tablet PC be positionable in a substantially stable and accessible orientation regardless of the underlying substrate. In particular, a user traveling in the passenger compartment of a vehicle must be able to view and manipulate the graphical user interface (GUI) of the tablet PC screen while seated and facing forward. The solution to this unmet need must provide a mounting apparatus that resists the destabilizing effects of turbulence, vibrations, lateral movement, and other disruptions without being so massive as to significantly impede a driver's view through a windshield, increase the clutter of a compartment, or obstruct the accessibility of an area. The ideal apparatus should be, in some embodiments, easily reversibly mountable so that a user can quickly move from one location or vehicle to another, while in other embodiments the mounting means should emphasize strength and permanence.

SUMMARY OF THE INVENTION

The present invention satisfies the needs described above. This invention provides an apparatus for adjustable mounting and emplacement of tablet PCs and other PPCs in any location. The apparatus can be configured to securely hold all commercially available tablet PCs and is not limited in applicability to any particular types of mounting substrates or conditions. In its most basic conceptualization, the invention comprises (1) a mounting means for attachment to various surfaces, flexibly connected to (2) an adjustably positionable frame for holding a tablet PC in a desired orientation. The flexible relationship between a dedicated mounting means and an independently positionable frame enhances the precision and security by which a tablet PC can be reversibly installed upon non-horizontal surfaces. The apparatus of the present invention thus enables the optimized emplacement of a tablet PC permanently or temporarily in any space, no matter how confined or irregular, making it exceptionally well-suited for use during travel in moving vehicles, participation in rigorous activities, reliability in rugged conditions, and adaptability to unforeseen circumstances.

In a preferred embodiment, the apparatus comprises a suction cup assembly as the mounting means connected to a rigging from which adjustable-length cordage descends to the top edge of a rectangular frame. The cordage suspends the frame vertically, while the frame holds a tablet PC between opposing lateral ledges or clips, such that the tablet PC touch screen is presented and maintained in an upright, forward-facing, unobstructed orientation. A user of the apparatus adjusts the cordage to regulate the distance between the mounting means and the frame to establish a preferred operating position. Additional stabilizing elements on the frame may interact with surfaces separate from the attachment substrate of the mounting means to further adjust and stabilize the emplacement of the tablet PC. The tablet PC may be conveniently removed from and inserted into the frame of the apparatus without significant effort on the part of the user and without significant assembly or disassembly of any part of the apparatus.

The present invention contemplates that a popular use for tablet PCs and related PPCs is for navigation during vehicular travel by virtue of navigation hardware and software contained therein, and the invention performs by enabling easy access by a driver or passenger of a vehicle to the screen of the tablet PC in order to operate it in a safe manner during travel. The present invention resides not merely in any one of the features set forth in this specification, but also in the particular combination of all of the features and improvements claimed.

The forgoing summary has outlined some features consistent with the present invention in order that the following detailed description thereof may be better understood, and in order that the present contribution to the art may be better appreciated. The present invention is not limited in its application, details, or components merely to those set forth in the following description and illustrations. Methods and devices consistent with the present invention are capable of other embodiments. Also, the phraseology and terminology employed herein are for the purpose of description and should not be regarded as limiting unless explicitly stated as such.

DETAILED DESCRIPTION OF THE DRAWINGS

Figure 1:
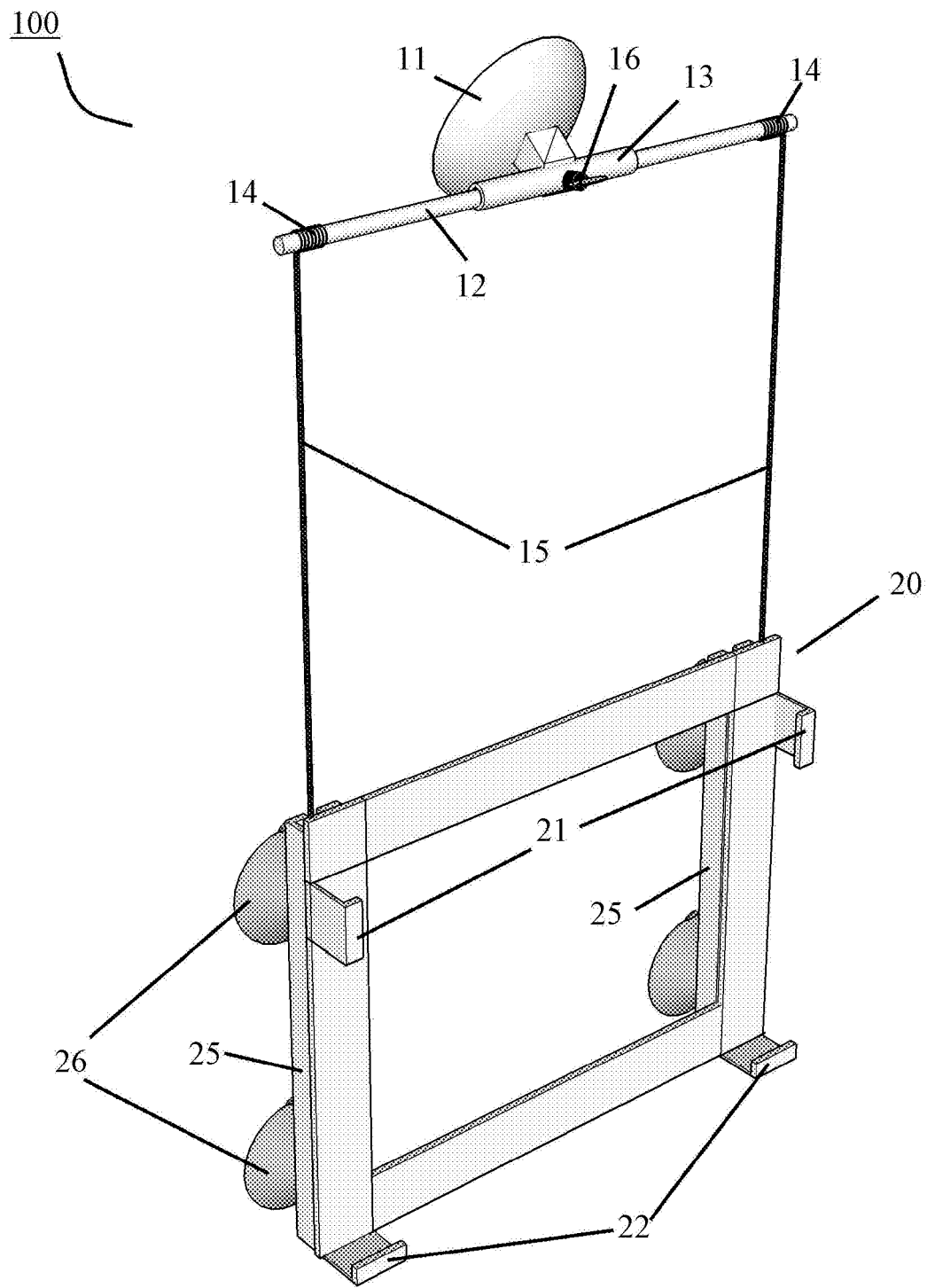
FIG. 1 is a perspective view of a preferred embodiment of the apparatus.

Throughout all the figures, same or corresponding elements are indicated by the same reference numerals. FIG. 1 is a perspective view of a preferred embodiment of the apparatus 100 in which a mounting means 11 comprises a suction cup assembly. The mounting means 11 may alternatively comprise a magnet, adhesive, bracket, screws, ball and socket, spring clip, and any other structure tending to achieve attachment to a surface. The mounting means 11 may also, or alternatively, comprise any elements useful for attachment of the apparatus 100 to a feature on a surface or in the environment. For example, although the suction cup assembly of the mounting means 11 depicted in FIG. 1 is ideal for attachment to a substantially smooth surface, the mounting means 11 in other embodiments of the invention may be adapted for hanging the apparatus 100 on a hook or similar protrusion, or for suspension of the apparatus 100 from the headrest of a car seat or from a rear-view mirror.

The mounting means 11 is connected to a hanger 12, either directly or via a connector element 13. The hanger 12 is attached to cordage 15, and said cordage 15 is connected to a frame 20 for holding a tablet PC or other personal computing device. The cordage 15 is variably connected to an adjustment means 14 for adjusting the length of the cordage 15 that extends between the hanger 12 and the frame 20, thereby enabling the adjustment of the position of the frame 20 relative to the position of the mounting means 11. In other words, the adjustment means 14 adjusts the effective length of the cordage 15 to raise and lower the frame 20. The operation of the adjustment means may be modulated by the action of a tensioning element 16. Generally, the tensioning element 16 provides a means for alternatively preventing or allowing the operation of the adjustment means 14, thereby preventing or allowing the adjustment of the effective length of the cordage 15, and thereby preventing or allowing the adjustment of the position of the frame 20 in relation to the position of the mounting means 11.

In the embodiment of FIG. 1, the hanger 12 is a horizontal rod attached to the connector element 13 in proximity to the mounting means 11. The cordage 15 comprises two strands of filament, wherein each strand of filament connects at one end to the hanger 12 and at an opposite end to the frame 20. The adjustment means 14 comprises a means for wrapping and unwrapping the cordage 15 about the rod of the hanger 12. In particular, the adjustment means 14 comprises a localized attachment between an end of the cordage 15 where the cordage 15 is bound to an end portion of the hanger 12 and where the cordage 15 can be wrapped and unwrapped around an end portion of the hanger 12. Said wrapping and unwrapping of the cordage 15 around the hanger 12 effectively alters the length of the cordage 15 which extends to the frame 20, thereby enabling the raising and lowering of the position of the frame 20 relative to the position of the mounting means 11. The cordage 15 as shown in FIG. 1 extends directly vertically downwards towards the frame 20, at a ninety (90) degree angle relative to the horizontal axis of the frame 20, but this is not limiting, and the cordage 15 may in practice extend at any angle from either the hanger 12 or the frame 20.

In the embodiment of FIG. 1, the horizontal rod of the hanger 12 is held in place by, and sits within, the connector element 13. The horizontal rod of the hanger 12 is rotatable along its longitudinal axis within the connector element 13, except when said rotation is prevented by the action of a tensioning element 16. The tensioning element 16 is a thumbscrew threaded through the connector element 13 that impinges upon the rotatable rod of the hanger 12 to prevent it from rotating within the connector element 13 when in a tightened position. Loosening of the tensioning element 16 permits the rotation of the rod of the hanger 12 and is accomplished by rotating the thumbscrew through several revolutions a counterclockwise direction. Tightening of the tensioning element 16 prevents the rotation of the rod of the hanger 12 and is accomplished by turning the thumbscrew in a clockwise direction. Rotation of the rod of the hanger 12 enables the adjustment of the length of the cordage 15 by causing the cordage 15 to wind or unwind around the end portion of the hanger 12 comprising the adjustment means 14. In alternative embodiments, the tensioning element 16 may be a constricting collar attached to the connector element 13 where the rotatable rod of the hanger 12 exits the connector element 13, said constricting collar being made to grip the rod of the hanger 12 to thereby prevent its rotation.

When a tablet PC is held by the frame 20, the position of the tablet PC may be lowered by extending the length of the cordage 15 between the horizontal rod of the hanger 12 and the frame 20. In the preferred embodiment of FIG. 1, the length of the cordage 15 is extended by first loosening the screw of the tensioning element 16, and then by rotating the horizontal rod of the hanger 12 about its longitudinal axis, thereby unwinding the cordage 15 about the adjustment means 14 of the rod of the hanger 12, and thereby moving the frame 20 farther away from the mounting means 11. Rotation of the rod of the hanger 12 may be achieved, for example, by the application of downwards force upon the cordage 15 which is wrapped around the adjustment means 14 of the rod of the hanger 12. The downwards force may result from the weight of the frame 20 or from manual application by a user. In order to raise the height of the tablet PC, a person manually turns the rotatable rod of the hanger 12 while the tensioning element 16 is in a loosened position. When the tablet PC rests in the frame at a position satisfactory to the user, the tensioning element 16 is tightened to prevent further rotation of the rod of the hanger 12.

Alternatively, the length of the cordage 15 may be manually adjusted by wrapping or unwrapping cordage 15 around the portion of the hanger 12 comprising the adjustment means 14 to effect a change in the positioning of the frame 20. Such a method would be useful in situations when it is not feasible to adjust the tensioning element 16 or to rotate the rod of the hanger 12, or in embodiments that do not include a tensioning element 16 or do not employ a rotatable rod as the hanger 12. In some embodiments, the adjustment means 14 is a motorized spool that adjusts the length of the cordage 15 by winding and unwinding under electronic control, and the hanger 12 may comprise a hollow tube through which the cordage 15 is threaded rather than a rotatable rod around which the cordage 15 is wrapped. Alternatively, in further embodiments there may be no rod at all, and the hanger 12 comprises only a motorized spool attached to the connector element 13 and/or the mounting means 11. The tensioning element 16 may also comprise electromagnetic resistance or other resistance within a motor which tends to resist rotation of a means for spooling cordage.

The cordage 15 may comprise any equivalent of a cord, strap, rope, or wire that is sufficiently durable to support the weight of the frame 20 when holding a PPC. The cordage 15 may comprise various materials appropriately selected for the location in which the user desires to mount the apparatus 100. If the apparatus 100 is used in a vehicle, for example, the cordage 15 can be thin and/or non-opaque, e.g., monofilament fishing line, so as not to obscure the driver's view. If the apparatus 100 is to be mounted from a seat in a car, airplane, or other seating area, such that the frame 20 is situated against the rear side of said seat for use by a person located behind said seat, the cordage 15 may comprise straps made of fabric. Alternatively, the cordage 15 may be any nylon, polyester, cotton, or similar material in the form of a line or strap.

A four-sided frame 20 is connected to the cordage 15. The frame 20 may be made of any material such as plastic, rubber, paper, woven fabric, or metal. In FIG. 1 the frame 20 is depicted having a solid inflexible plastic construction, but the invention comprises frames made of flexible materials like rubber, canvass, nylon, cotton, or the like, which may or may not be reinforced by rigid internal supporting members to provide consistency of shape.

Attached to the frame 20 near each of its corners are four clips, arranged in two pairs, described as an upper clip pair 21 and a lower clip pair 22. Each of the clip pairs 21 or 22 comprises two individual clips facing inwards relative to the perimeter of the frame 20. The clips of the upper clip pair 21 face inwards towards each other along the x-axis or horizontal axis of the frame 20. Conversely, the clips of the lower clip pair 22 face upwards along the y-axis or vertical axis of the frame 20. This substantially transverse orientation of the clip pairs 21 and 22 enhances the stability of the attachment between the frame 20 and the tablet PC, particularly during travel, because it allows the clips to hold the tablet PC from the bottom and sides simultaneously in order to prevent the tablet PC from sliding off the frame 20 during horizontal and lateral motion. This advantageous feature of the invention, having dual clip pairs in substantially transverse orientations located near the corners of a frame, provides maximum attachment stability for a tablet PC while using a minimum of materials.

Figure 2A:
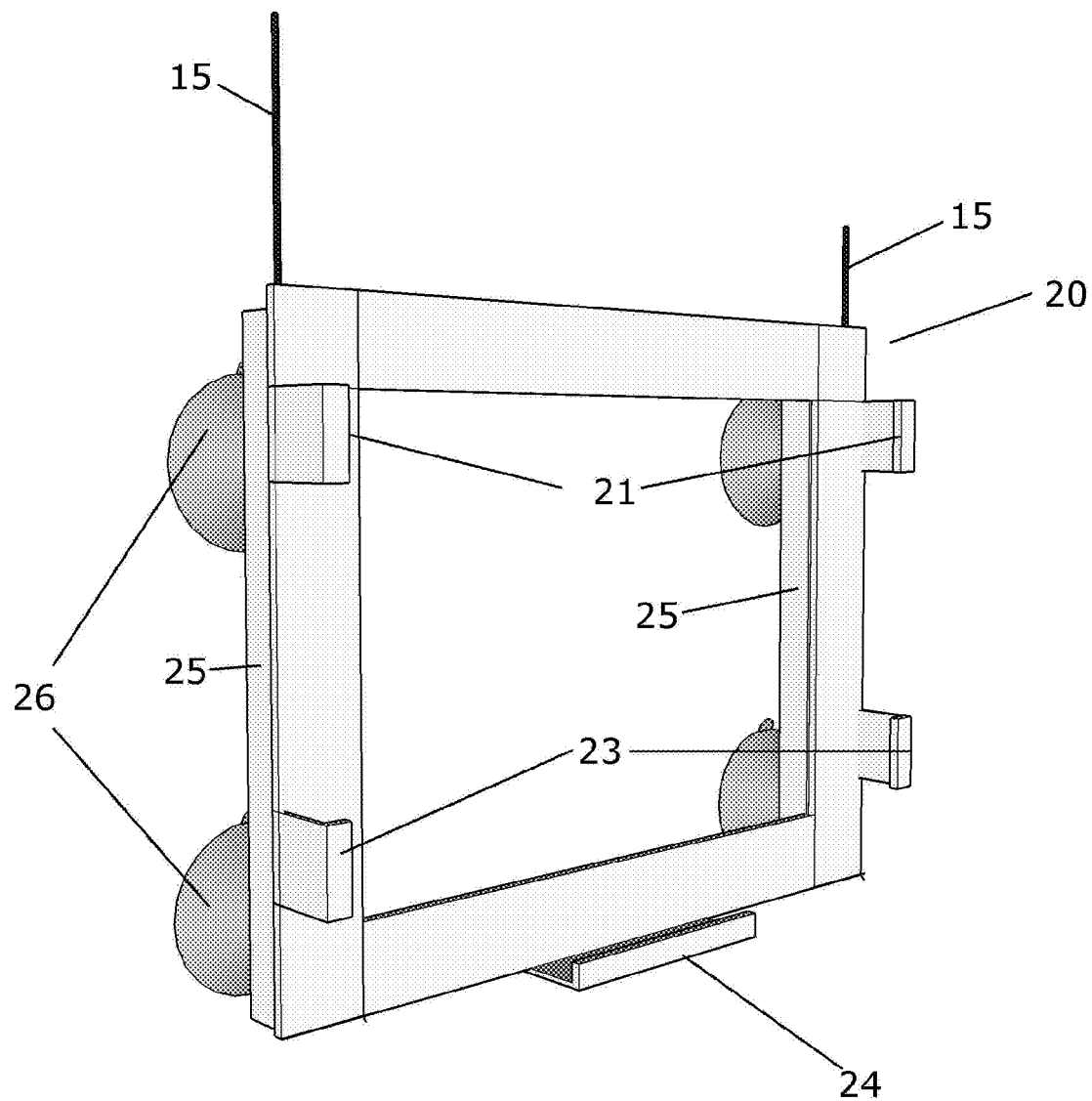
FIG. 2A is a perspective view of a preferred embodiment of the apparatus showing an alternative arrangement of clips on the frame.
Figure 2B:
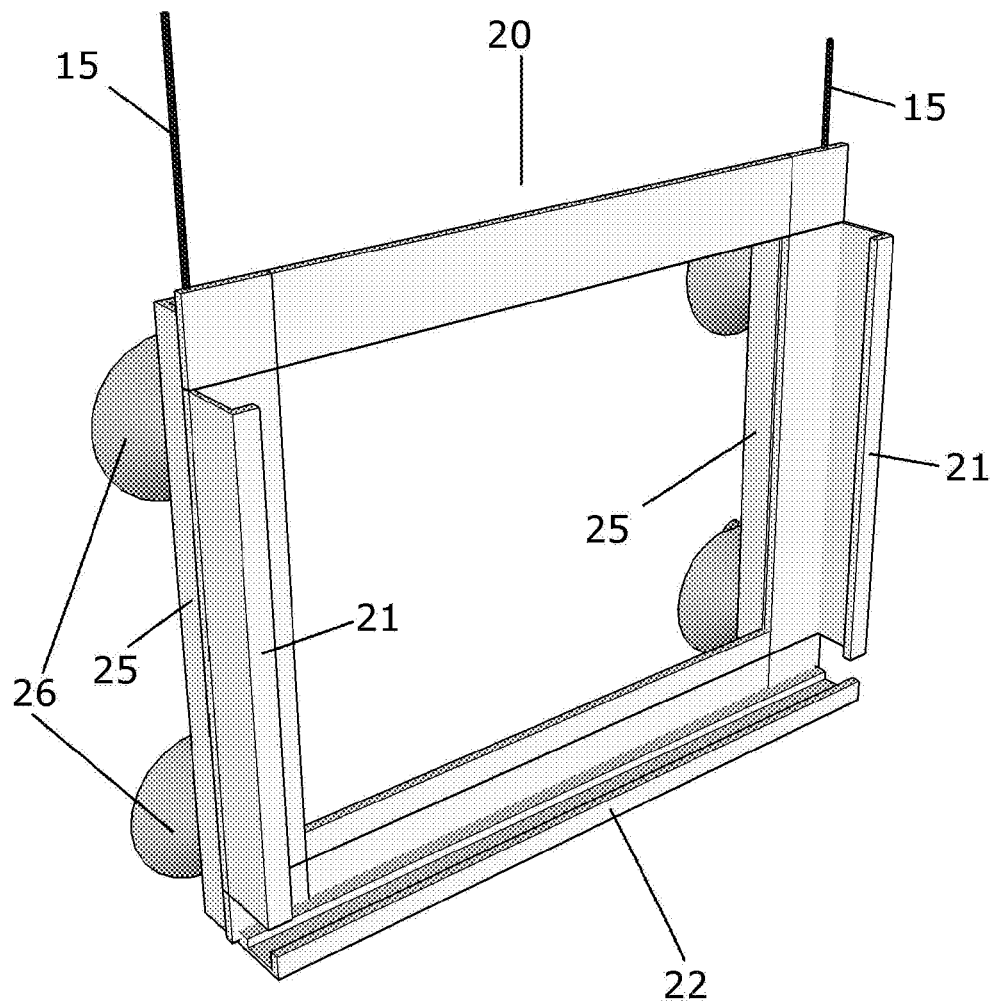
FIG. 2B is a perspective view of a preferred embodiment of the apparatus in which the clips are elongated on the frame.

Sometimes, using the minimum amount of materials is not advantageous, and so each of the clips may be wider than those shown in FIG. 1. Whereas the clips shown in FIG. 1 may be, for example, 0.25 to 1.0 inches wide, clips in other embodiments could be several inches wide and may even extend for substantially the full length of any side of the frame 20. Alternatively, as shown in FIG. 2A, an additional set of clips, clip pair 23, can be attached in a parallel orientation below clip pair 21 in embodiments where increased support for the tablet PC is desired. On the bottom edge of the frame 20, the two clips of clip pair 22 may be merged into a single clip 24. In embodiments of the invention in which conservative use of materials is not desired, clips may extend substantially along the entire lengths of the left, right, and bottom edges of the frame 20, as shown in FIG. 2B.

Figure 3:
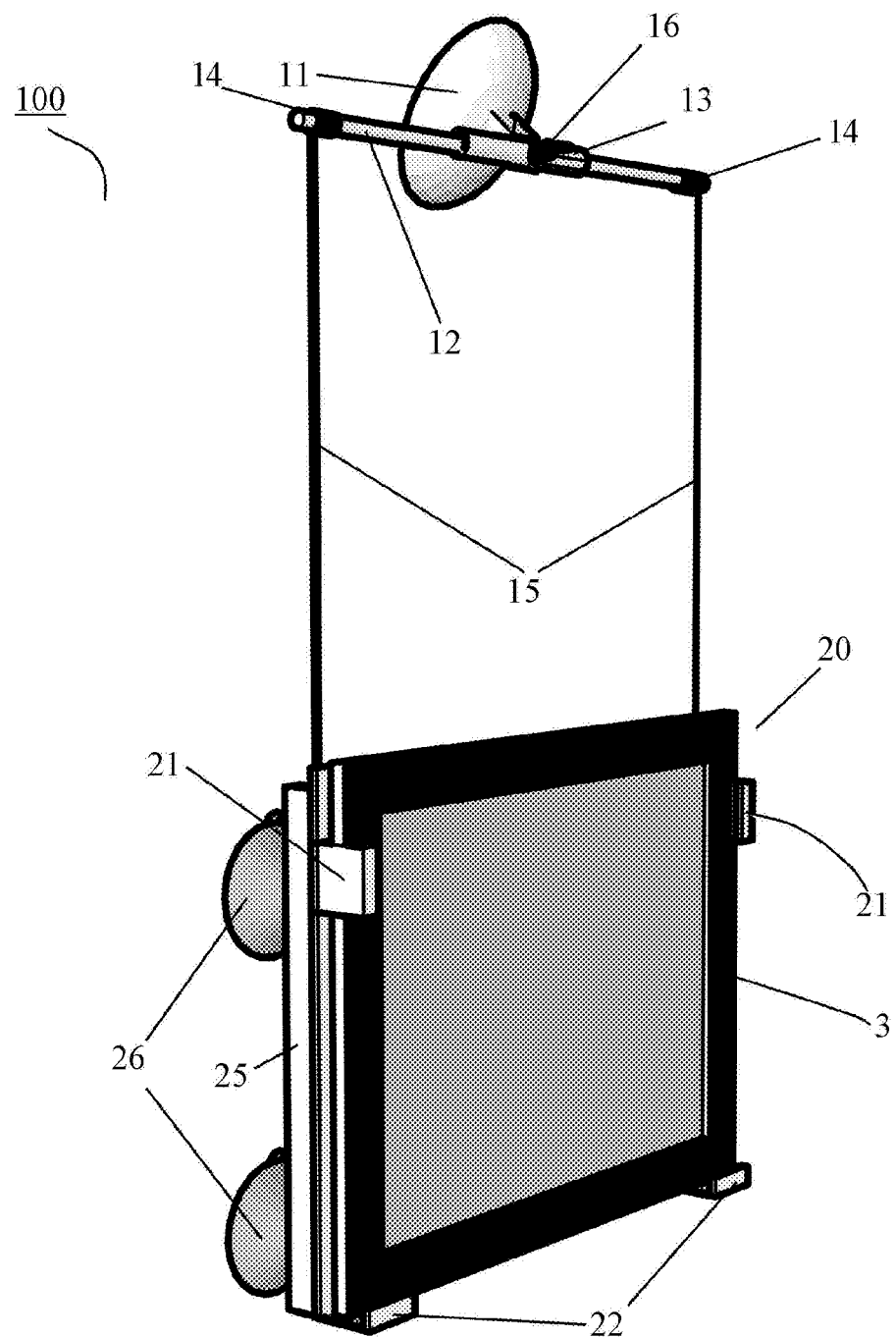
FIG. 3 is a perspective view of a preferred embodiment of the apparatus holding a tablet PC within the frame.

FIG. 3 illustrates the apparatus 100 holding a tablet PC 3 within the frame 20. A tablet PC 3 slides into position on the frame 20 when lowered into the gap between the clips of the upper clip pair 21 until the bottom edge of the tablet PC 3 comes to rest upon the clips of the lower clip pair 22. Removal of the tablet PC 3 from the frame 20 of the apparatus 100 is accomplished by simply lifting the tablet PC 3 up through the gap between the clips of the upper clip pair 21. While prior art mounting devices are defeated by the bulk and weight of tablet PCs, the present invention capitalizes on said bulk and weight to increase the security of the attachment between the tablet PC 3 and the clips of the lower clip pair 22 upon which it rests. The weight and dimensions of a typical tablet PC thus render it so firmly attached to the frame 20 of the apparatus 100 that only a complete inversion of the apparatus 100 can dislodge the tablet PC 3 from its attached position. Even this unlikely contingency can be easily corrected by the addition of further clips or fastening means at the top edge of the frame 20, as contemplated for other embodiments of the present invention.

FIG. 3 demonstrates that the tablet PC 3 may be positioned at a distance from the actual site of attachment between the mounting means 11 and some surface or object in the environment. Adjustment of the actual position of the tablet PC 3, by virtue of its confinement within the frame 20, is easily regulated by adjusting the effective length of the cordage 15. The precise emplacement of the tablet PC 3 may be further regulated by stabilizers 26 attached to the rear surface of the frame 20. Stabilizers 26 may comprise suction cup assemblies and other structures tending to achieve attachment to a surface. Stabilizers 26 may interact with the same surface to which the mounting means 11 attaches, or to different surfaces and structures in the environment. Multiple stabilizers 26 may be attached to the rear side of the frame 20 and they may be adapted for use in any general or specific location.

For example, when the apparatus 100 is mounted in an automobile and the mounting means 11 is attached to a windshield, the frame 20 holding the table PC 3 may hang suspended to a position near the lower console of the dashboard. One or more stabilizers 26 may interact with the dashboard or console of the automobile to prevent the frame 20 and tablet PC 3 from swaying, twisting or otherwise shifting position during movement of the vehicle. Various custom stabilizers 26 may be specifically manufactured for application in designated conditions or locations, such as in specific models of automobiles, for example, where they may be designed according to the particular contours of the dashboard or center console. Stabilizers 26 are intended not only to facilitate attachment, but also to adjustably control the orientation of the frame 20 and tablet PC 3 to achieve fine control over the angle and direction of emplacement during use.

Figure 4A:
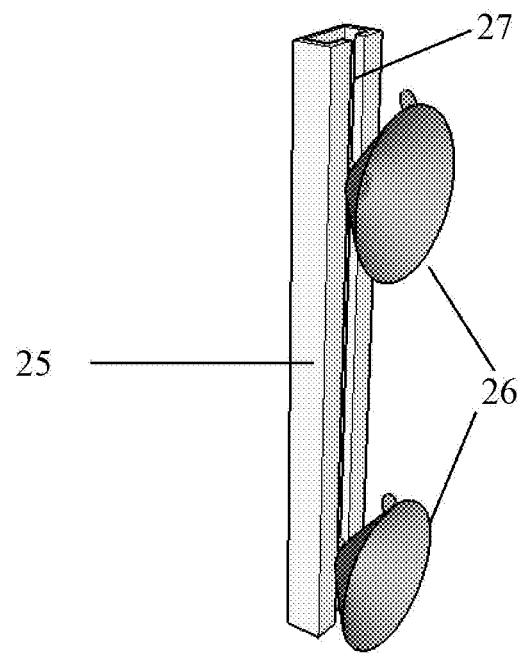
FIG. 4A is a perspective view of one example of a type of versatile stabilizer attachment means.
Figure 4B:
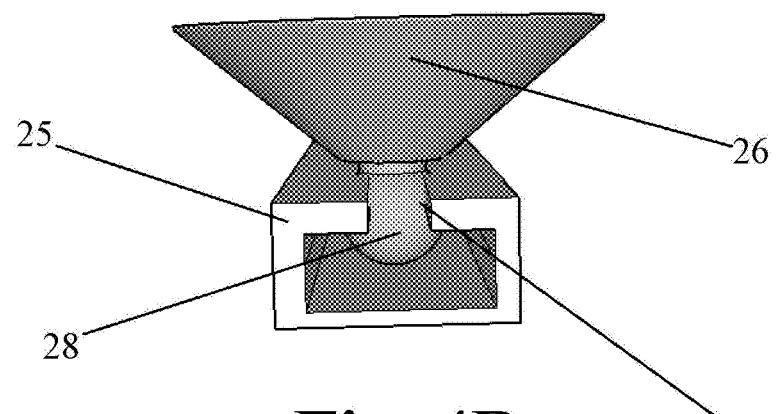
FIG. 4B is an end view of one example of a type of versatile stabilizer attachment means.

Stabilizers 26 may be swappable by virtue of a versatile stabilizer attachment means 25, such that the frame 20 of a single apparatus 100 may be equipped with different stabilizers 26 at different times according to specific needs. FIGS. 4A and 4B show a perspective view and an end view, respectively, of an example of a versatile stabilizer attachment means 25. In this embodiment, the stabilizer attachment means 25 comprises a bar having a channeled extrusion or slot 27 on a side facing away from the frame 20, wherein the slot 27 receives a knobbed end 28 of a stabilizer 26 such as a suction cup. If the apparatus 100 is moved to a locale where an adhesive or a magnet would be superior to a suction cup as a stabilizer 26, then adhesives or magnets, each having knobs 28 compatible with the slot 27 of the stabilizer attachment means 25, can be swapped in while the suction cups are swapped out by sliding said stabilizers 26 along the slot 27 until they exit the bottom of the bar. One or more instances of such a versatile stabilizer attachment means 25 may be attached to the rear surface of the frame 20, preferably one per side.

Figure 5A:
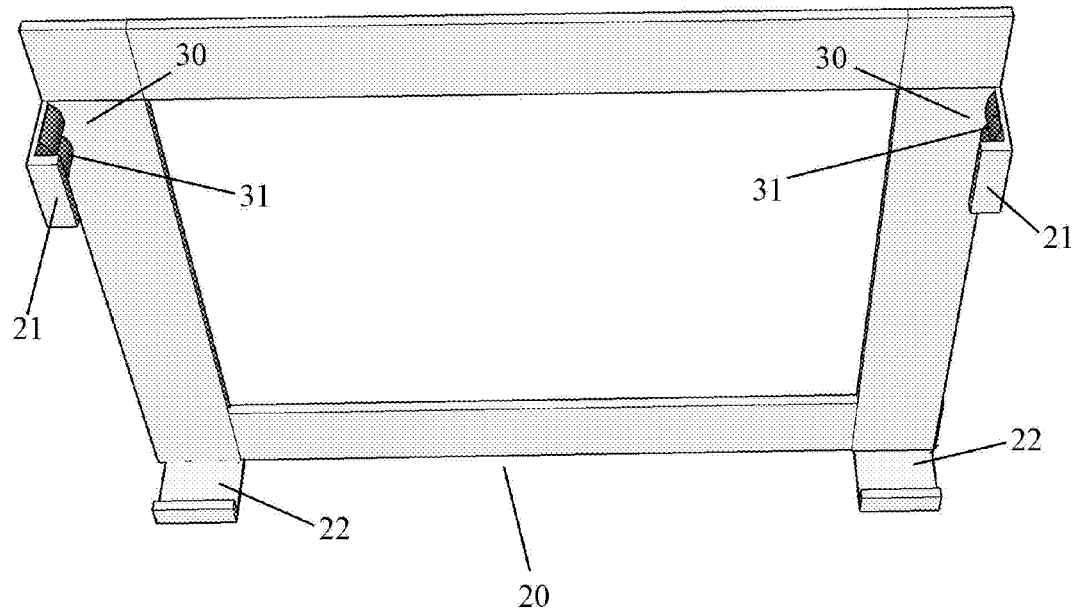
FIG. 5A is a perspective view of the frame of the apparatus illustrating a simple resilient compression means for stabilizing a tablet PC between the clips of the frame.

Further embodiments of the invention may comprise a resilient compression means 30 for gripping the lateral edges of a tablet PC when inserted into the frame 20, or for effectively increasing the pressure applied by the clips to the tablet PC 3 inside the frame 20. FIG. 5A shows two iterations of a resilient compression means 30 attached to the interior surface of each clip of clip pair 21. The resilient compression means 30 in this embodiment comprises a flexible metal band 31 attached to the inside surface of a clip. When a tablet PC is inserted into the frame 20, the outer surface of the flexible metal band 31 of the resilient compression means 30 pushes against the lateral edges of the tablet PC, thus holding it more firmly in place between the clips of clip pair 21. This arrangement can be repeated in other embodiments such as those that comprise two lateral clip pairs 21 and 23. Or, instead of a metal band, the resilient compression means 30 may be a strip of felt, a foam cushion, or other spongy material, for example.

Figure 5B:
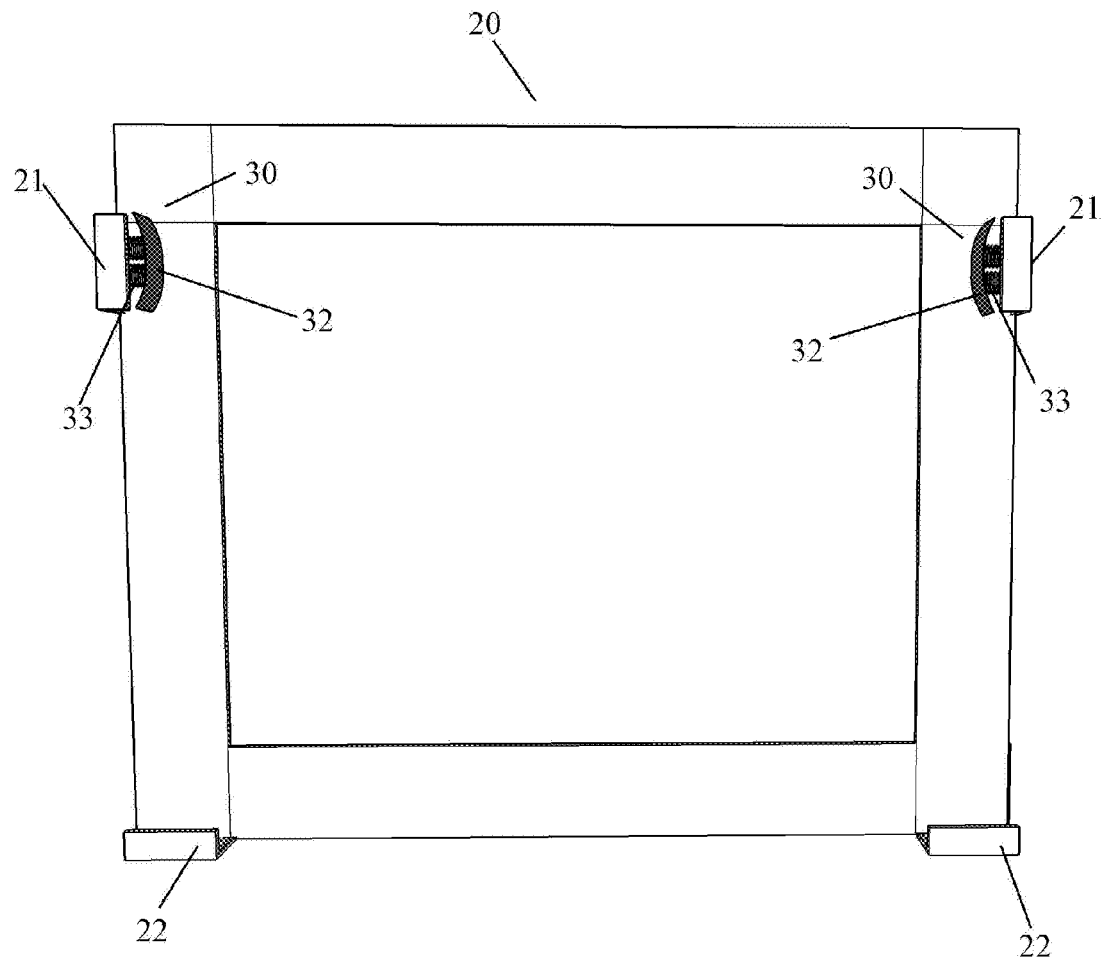
FIG. 5B is a front view of the frame of the apparatus illustrating a complex resilient compression means for stabilizing a tablet PC between the clips of the frame.

A more elaborate resilient compression means 30 may comprise a platform 32 supported by springs 33 as shown in FIG. 5B. The platform 32 is depressed by the lateral edges of a tablet PC 3 as it is inserted into the frame 20 between the clip pair 21, said platform 32 being pushed against the resistance in the springs 33 which extend transversely from the interior surface of the clips of the clip pair 21.

Alternative Configurations for Adjusting Length of Cordage

Figure 6:
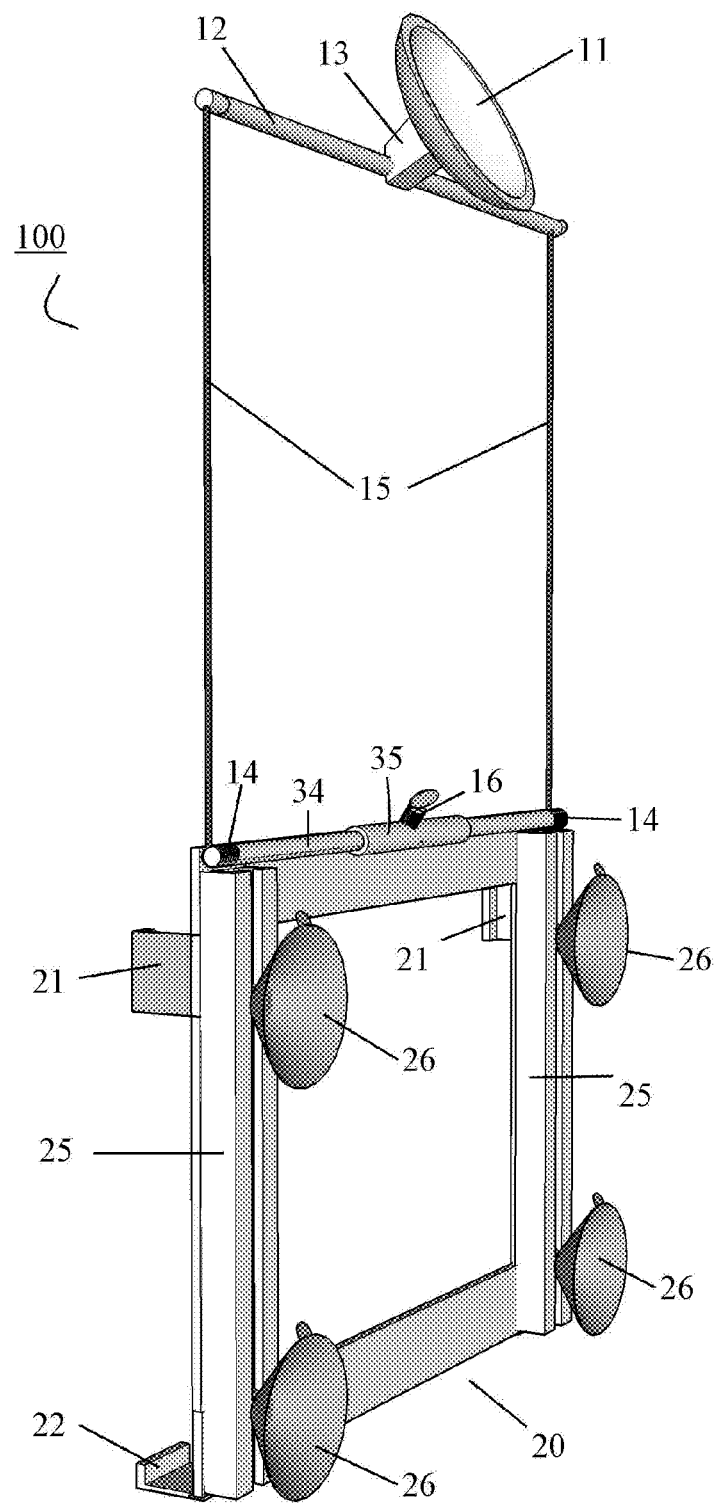
FIG. 6 is a rear perspective view of a second preferred embodiment of the apparatus having an adjustment means attached to the frame rather than at the mounting means.

FIG. 6 shows an alternative configuration for the apparatus 100, in which the adjustment means 14 is attached at the frame 20 instead of at the mounting means 11. Another way to describe this alternative arrangement is to say that the adjustment means 14 is attached to the opposite ends of the cordage 15 as compared to the arrangement depicted in the embodiment of FIG. 1. In FIG. 6, the hanger 12 remains attached to the connector element 13 in proximity to the mounting means 11, however, the hanger 12 is not rotatable. The cordage 15 extends from one end downwards from the hanger 12 and attaches at its opposite end to the adjustment means 14. The adjustment means 14 may comprise the end portions of a second horizontal rod 34 similar to the structure previously described as the hanger in the embodiment of FIG. 1. Said second horizontal rod 34 is attached to the frame 20 by a connector element 35 that has a thumbscrew as a tensioning element 16. Adjustment of the effective length of the cordage 15 for adjusting the position of the frame 20 relative to the position of the mounting means 11 is achieved as described for the embodiment of FIG. 1.

Figure 7:
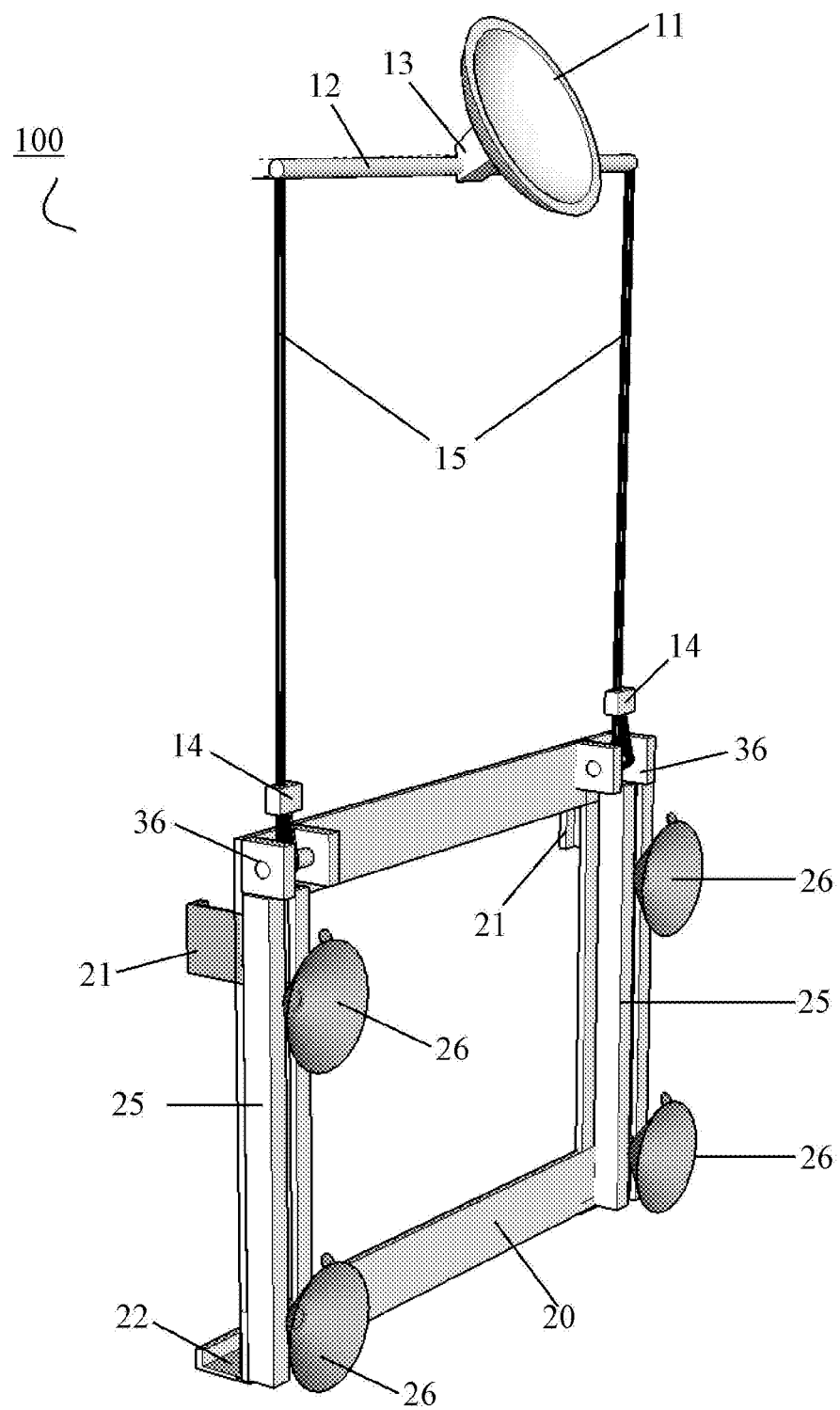
FIG. 7 is a rear perspective view of a third embodiment of the apparatus wherein the adjustment means is a cord clamp.

In another alternative configuration, illustrated in FIG. 7, the adjustment means 14 is a clamp, a barrel nut, a re-closable fastener, a buckle or similar strap adjustment assembly, or any other means for controlling the length of a looped cord or strap. The cordage 15 is attached to the hanger 12 fastened to the mounting means 11, and as the cordage 15 descends to the frame 20, it loops around a ring, pulley, peg or similar loop attachment element 36 on the frame 20, whereupon it extends upwards again to join with the adjustment means 14, which is manually positioned by the user of the invention at a desired location between the frame 20 and the hanger 12. The user may slide or move the adjustment means 14 higher or lower to adjust the effective length of the cordage 15, thereby adjusting the position of the frame 20 relative to the position of the mounting means 11.

Using the Invention to Mount a Tablet PC within an Automobile

Figure 8:
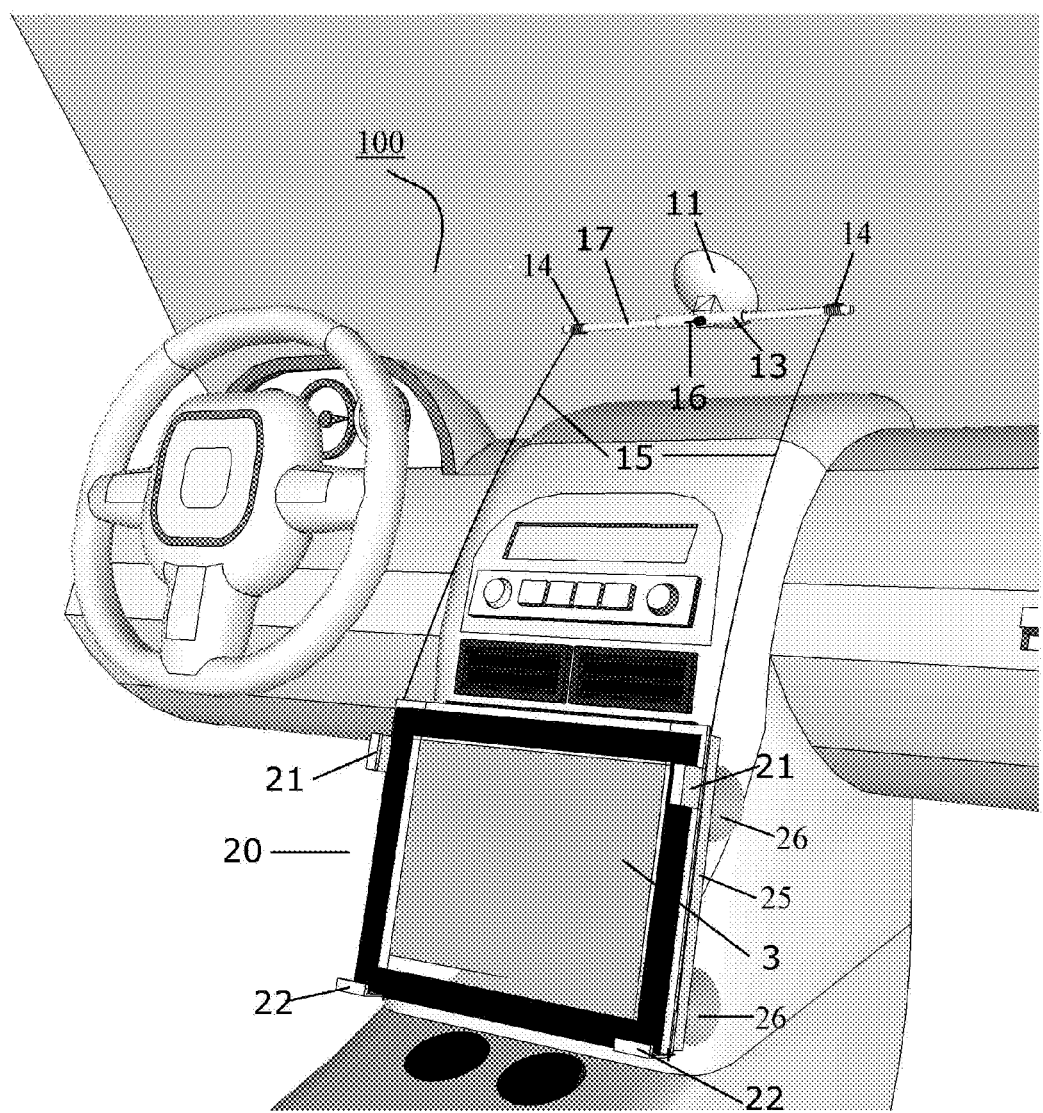
FIG. 8 is a perspective view of the invention being used to mount a tablet PC in the front compartment of an automobile.
Figure 9:
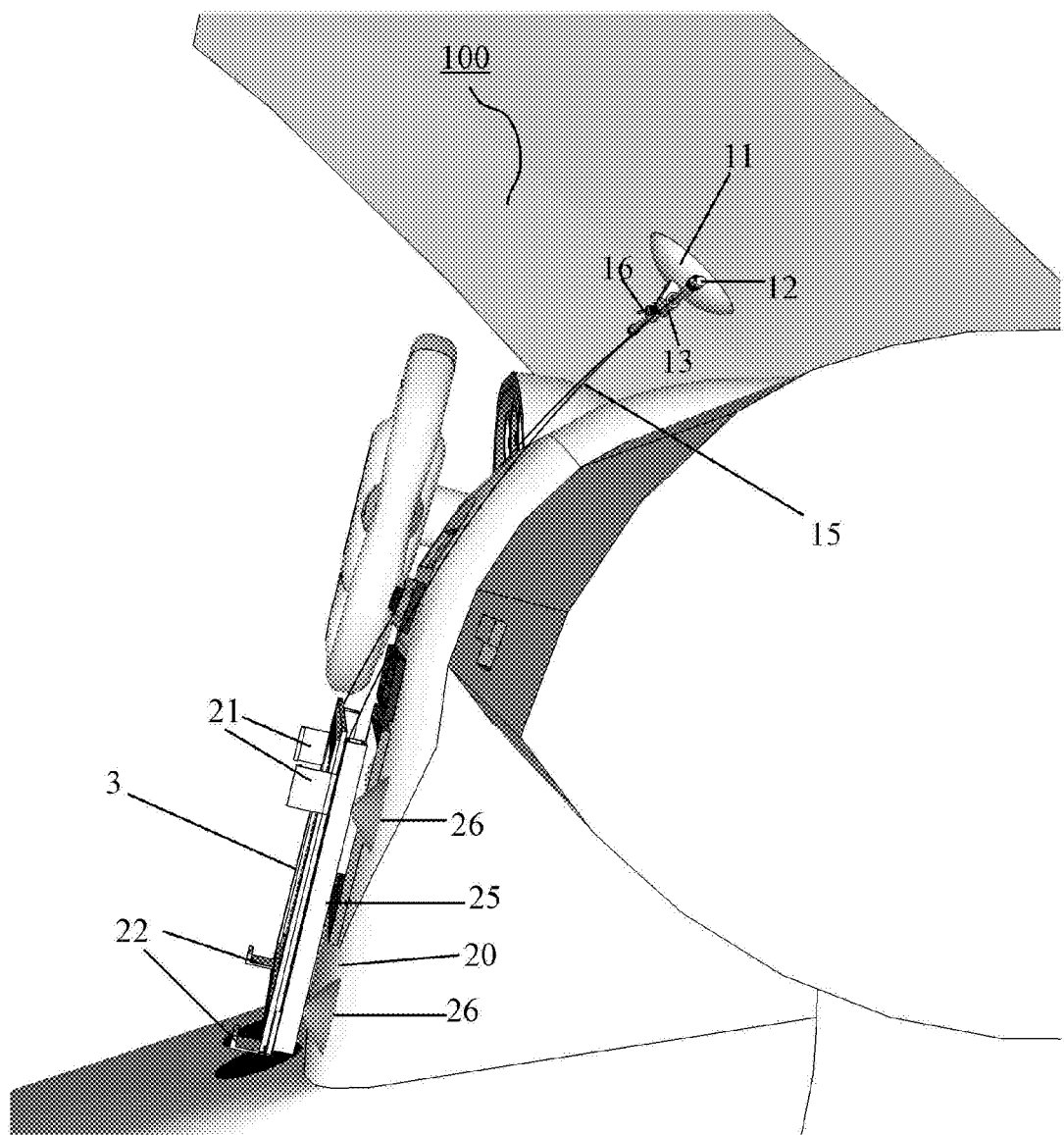
FIG. 9 is a side view of the invention being used to mount a tablet PC in the front compartment of an automobile.

FIG. 8 illustrates a perspective view of the apparatus 100 of the present invention holding a tablet PC 3 in the frame 20 while the mounting means 11 is attached to the interior surface of a windshield in an automobile. The adjustment means 14 is adjusted so that the frame 20 is situated at an appropriate location adjacent to the center console of the lower dashboard. The stabilizers 26 contact the lower part of the dashboard to hold the frame 20 in a stationary position and prevent lateral swinging. The contact between the stabilizers 26 and the lower dashboard is particularly apparent in FIG. 9, which is a side view of the apparatus 100 of the present invention holding a tablet PC 3 in the frame 20 while the mounting means 11 is attached to the interior surface of a windshield in an automobile.

Figure 10:
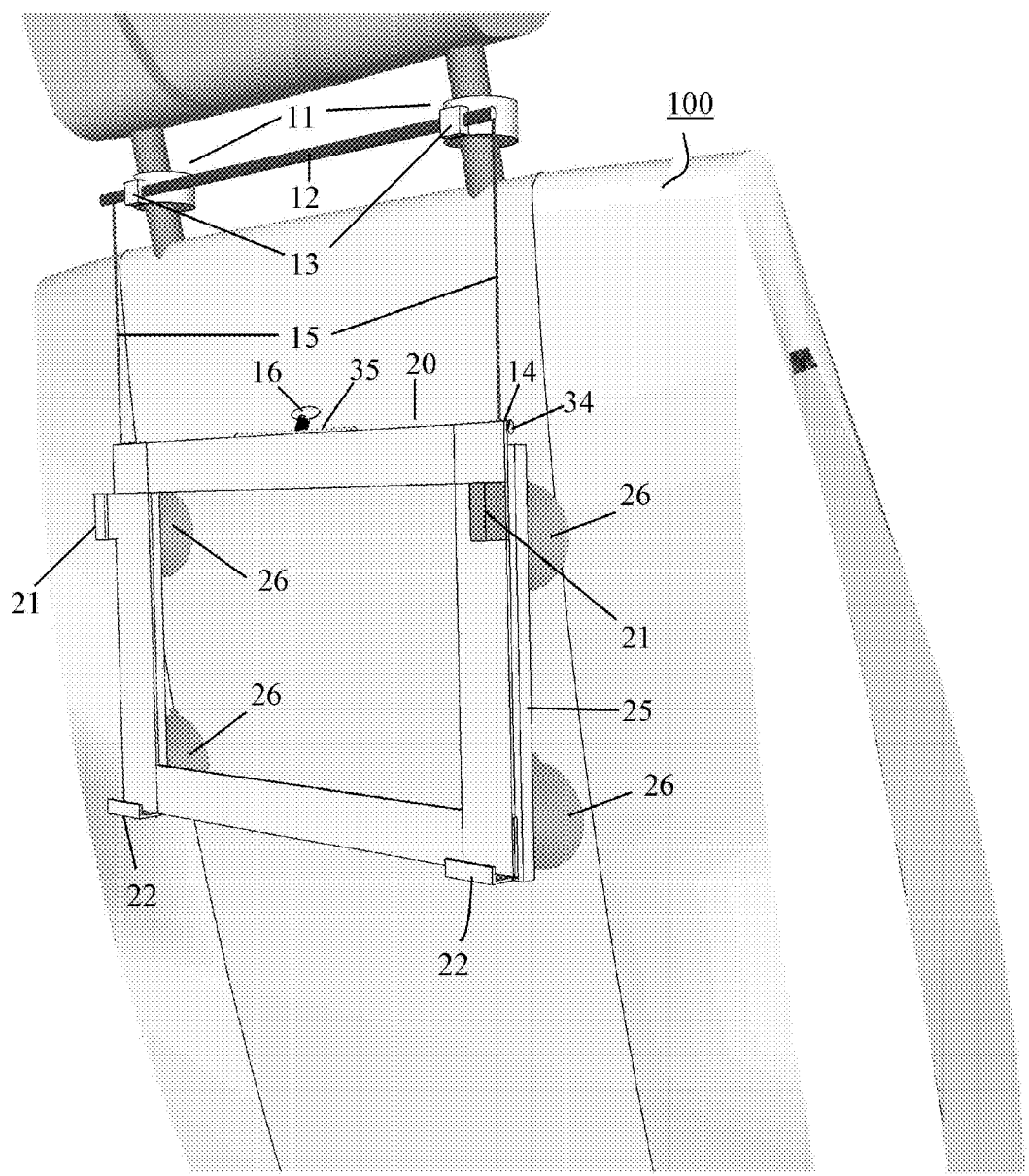
FIG. 10 is a perspective view of the invention mounted on the back of a car seat.

FIG. 10 is a perspective view of the apparatus 100 mounted on the back of a car seat to be conveniently operable by a passenger behind the seat. The mounting means 11 comprises a pair of clasps attached to the two arms that support a headrest above the seat. The mounting means 11 is attached to the hanger 12 by a connector element 13, and the cordage 15 extends downwards from the hanger 12 to the frame 20. The frame 20 hangs at a position behind the seat back and is attached thereto by stabilizers 26. The stabilizers 26 are independently adjustable spacers, and the orientation of the frame 20 is maintained in a vertical plane despite the tilt of the seat, because the bottom spacers extend slightly farther than the top spacers from the rear surface of the frame 20.

Frame Size Variability

Tablet PCs range in sizes from approximately 5 (five) inches to approximately 10 (ten) inches in width, and between 3 (three) and 10 (ten) inches in height. The present invention accommodates size variability in several ways. First, the resilient compression means 30 may occupy any gap between the lateral edges of a tablet PC and the confining clips when said gap is less than approximately one inch wide. Alternative embodiments utilize an adjustable frame 20 in which each side of the frame 20 may slide relative to the other sides of the frame 20, as depicted, for example, in FIG. 11 and FIG. 12.

Figure 11:
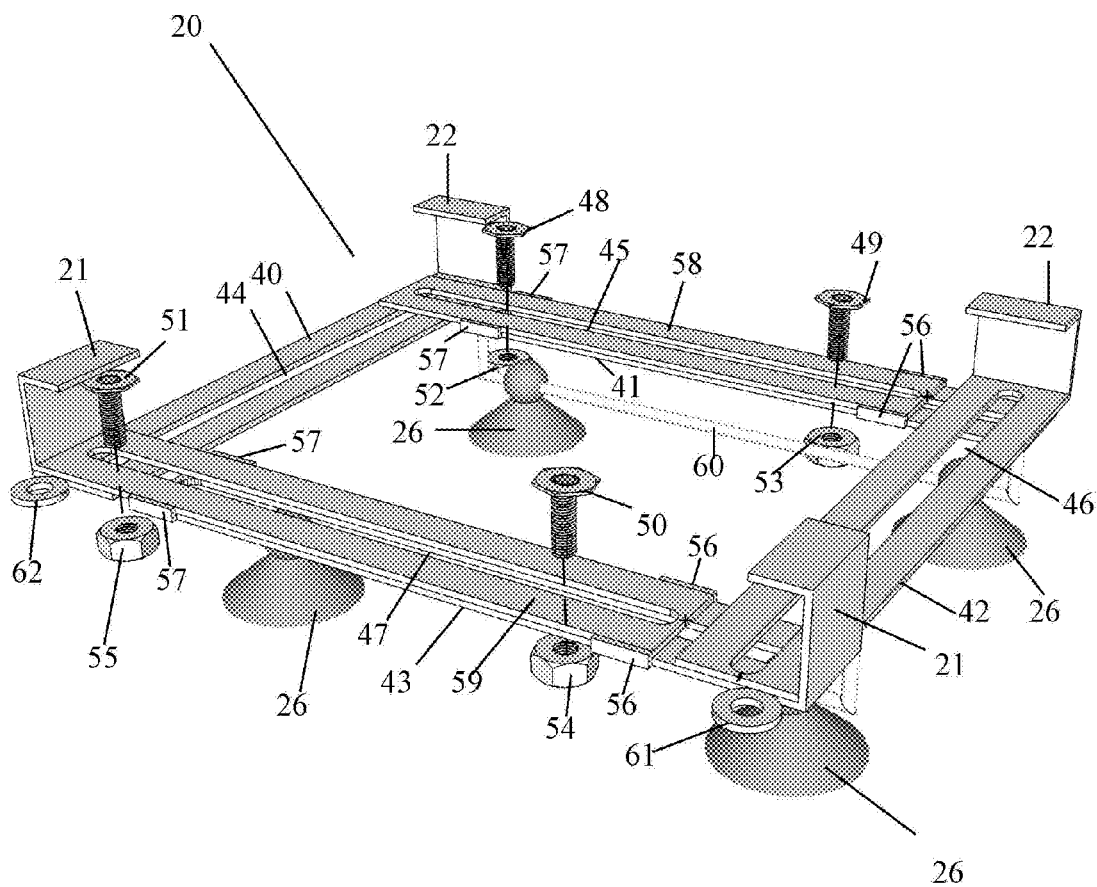
FIG. 11 is a front perspective view of a fourth embodiment of the invention having adjustable frame dimensions.

FIG. 11 shows a perspective view of a front surface of the apparatus 100 having a frame 20 with adjustable dimensions. Adjustability of frame dimensions in this embodiment is achieved by constructing the edges of the frame from slats 40, 41, 42, 43 with a central groove 44, 45, 46, 47 in each, wherein said central groove receives the threaded portion of a bolt, peg, or similar fastening means 48, 49, 50, 51. Said bolts have a flat surface and may be fastened to their respective slat by a nut 52, 53, 54, 55. One or more of the slats 41 and 43 may comprise two adjacent members sandwiched together by one or more guide elements 56 and 57, so that a second slat 58 and 59 is positioned above the first slat 41 and 43, respectively. The sandwiched slats, 41 and 58 on the one side, and 43 and 59 on the opposite side, slide over one another between the edges of the guide elements, 56 and 57, respectively. Extension of the sliding slats 41, 43, 58, 59 extends the length of the respective side of the frame 20, and retraction of said sliding members contracts the length of the respective side of the frame 20. Although not shown in FIG. 11, the other two sides of the frame 20 may also or alternatively comprise sliding slats. Clip pairs 21 and 22 are also shown extending from the front surface of the frame 20.

Figure 12:
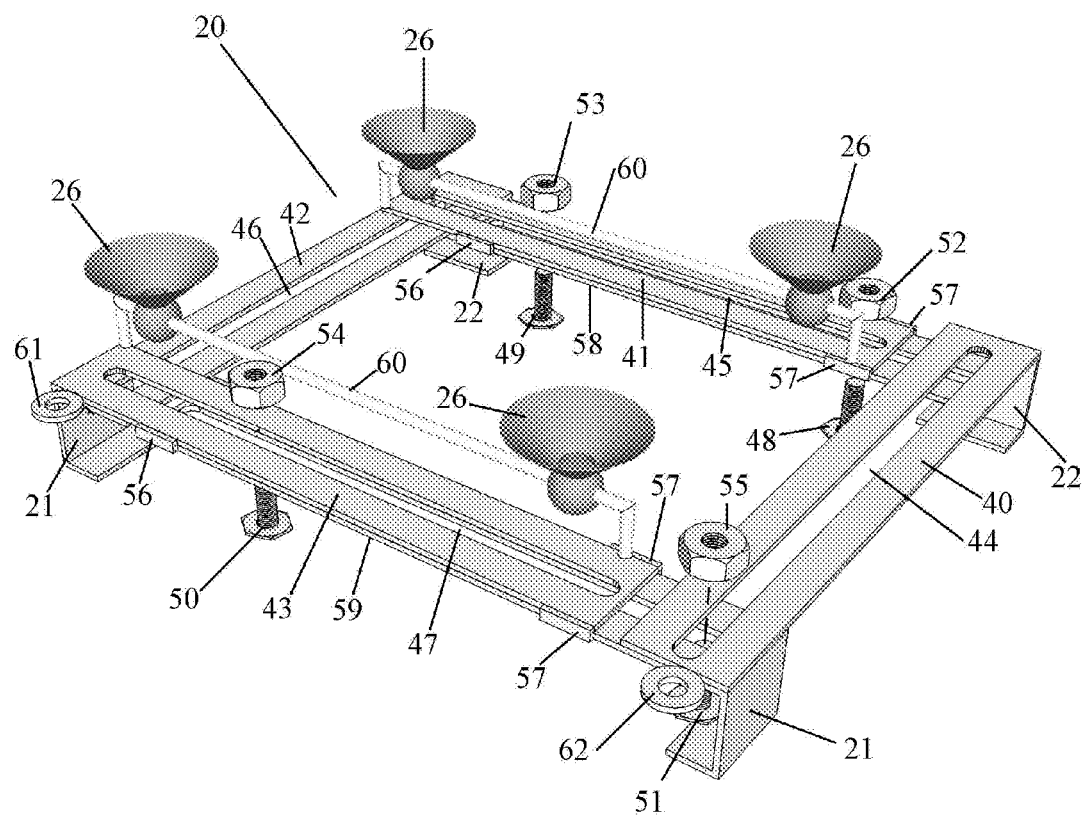
FIG. 12 is a rear perspective view of the fourth embodiment of the invention having adjustable frame dimensions.

FIG. 12 is a perspective view of the rear surface of the apparatus 100 having the frame 20 with adjustable dimensions. Any of the slats 40, 41, 42, 43 may be constructed such that they are continuous with any of the clips, such as the clips of clip pairs 21 and 22. Both FIG. 11 and FIG. 12 depict four stabilizers 26, which in this embodiment are suction cup assemblies comprising a rod 60 attached to the slats 41 and 43 of the frame 20. Two rings 61 and 62 serve as attachment points for the cordage 15 and may be construed as equivalent to the loop attachment elements 36 of the embodiment shown in FIG. 7, above.

Figure 13:
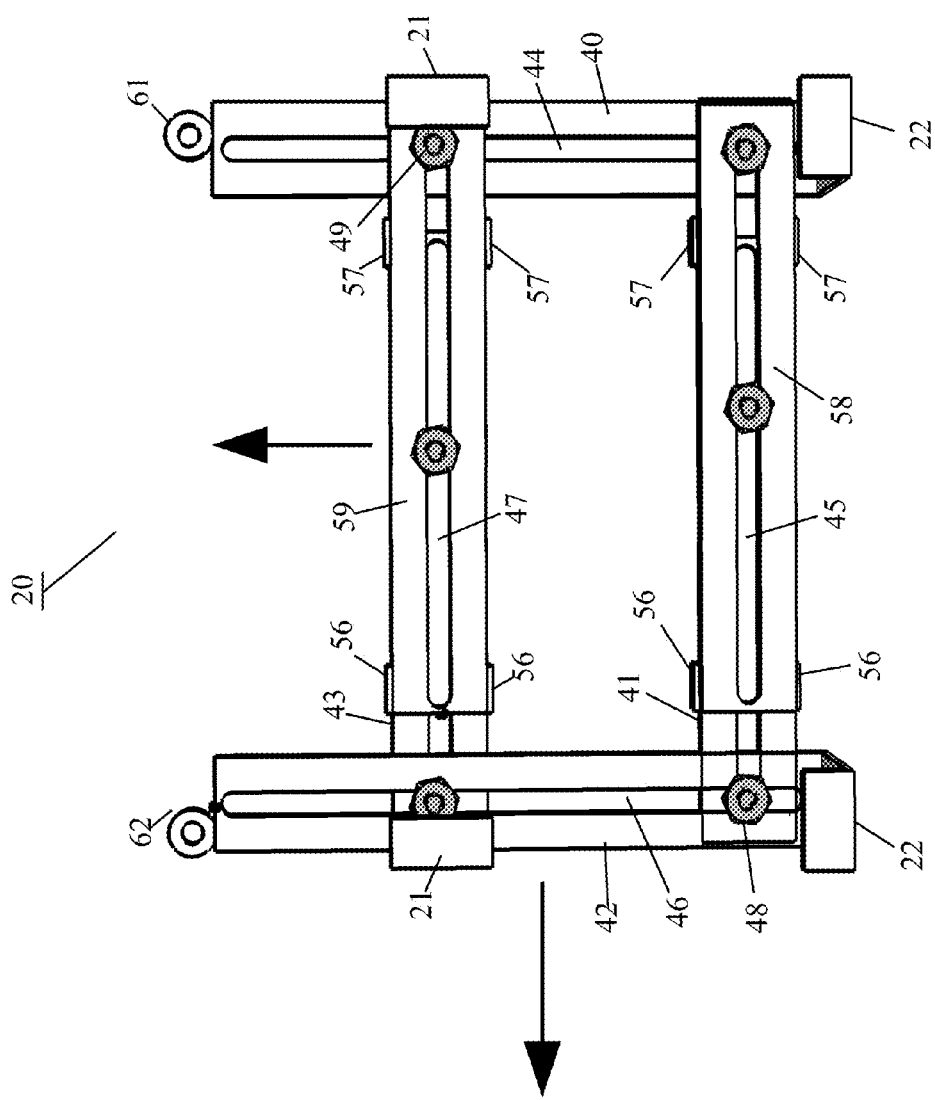
FIG. 13 is a top view of the frame showing the movement of slats during adjustment of the horizontal length and vertical height of the frame, where the frame size is being increased by moving the slats outwards from the center of the frame.

FIG. 13 illustrates how the sides of the frame 20 can be moved relative to each other to adjust the horizontal length and vertical height of the frame in a manner that enlarges the dimensions of the frame during use. The movement of the sides is accomplished without disassembling the frame 20; retaining bolts or their corresponding nuts (e.g., 48, 49), which pass through grooves (e.g., 44, 45, 46, 47) in the slats (e.g., 40, 41, 42, 43) that comprise the sides of the frame 20, are loosened slightly to permit the slat members to slide relative to each other, and then said bolts are re-tightened when the dimensions are established to the satisfaction of the user. The frame 20 would be attached to the cordage 15 (not shown) at eye-rings 61 and 62, for example. The slats are guided and positioned as they slide relative to each other via guides (e.g., 56 and 57). The "top side" of the frame 20, for example, would be considered as comprising slats 43 and 59. The large shaded arrow pointing upwards in the drawing represents motion of the top side of the frame 20 in the vertical direction. The large black arrow pointing leftwards represents motion of the left side of the frame 20 in the horizontal direction. The left side in this example comprises slat 42. Notice how the clips of the clip pairs 21 (horizontal clip pairs) and 22 (vertical clips), being attached to the various sides of the frame, are effectively moved away from each other as the frame expands, thus enabling the frame to accommodate a larger tablet PC or other device inside of it in a finely adjustable and continuously adjustable manner.

Figure 14:
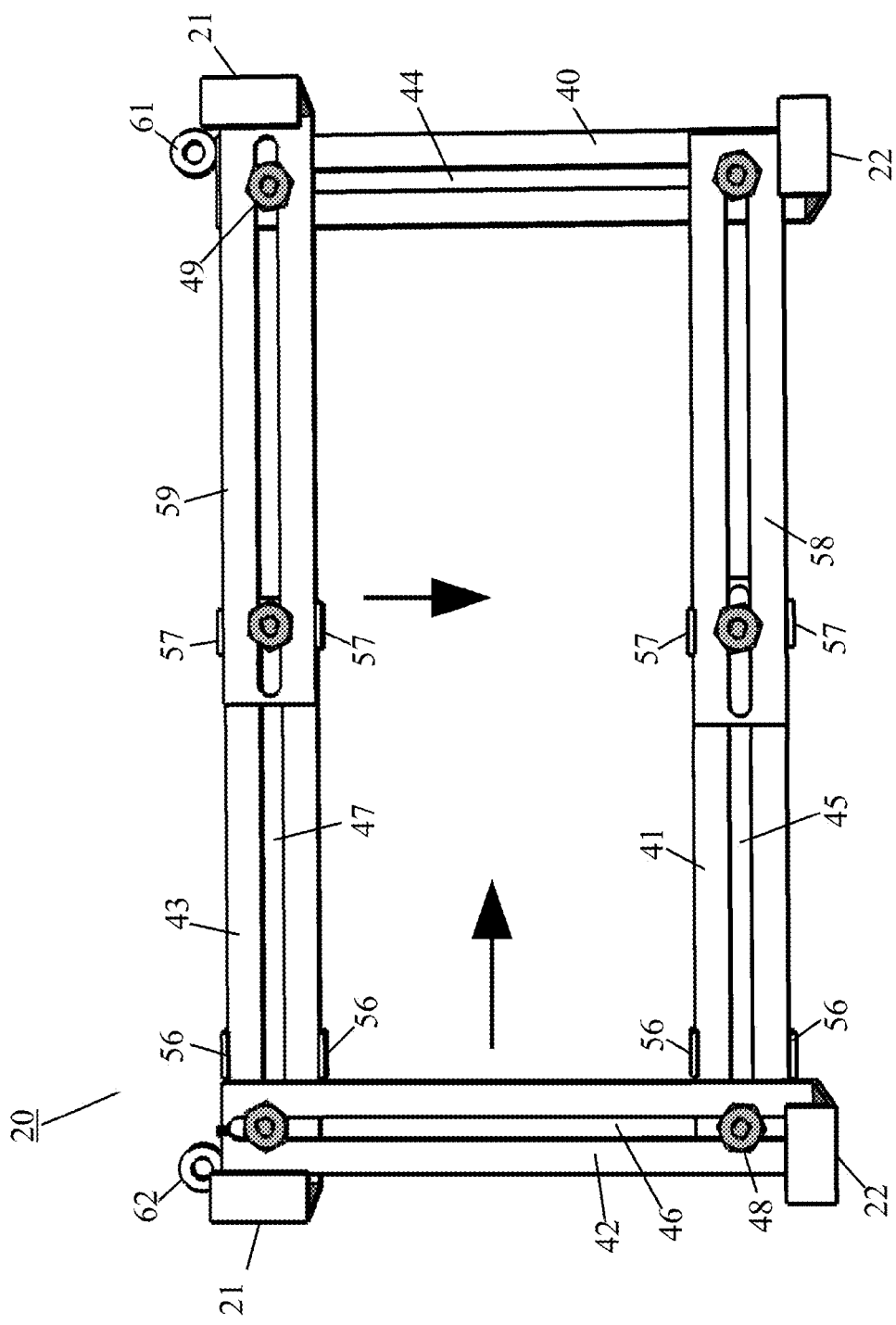
FIG. 14 is a second top view of the frame showing the movement of slats during adjustment of the horizontal length and vertical height of the frame, where the frame size is being reduced by moving the slats inwards towards the centerpoint of the frame.

FIG. 14 illustrates how the sides of the frame 20 can be moved relative to each other to adjust the horizontal length and vertical height of the frame in a manner that reduces the dimensions of the frame during use. The movement of the sides is accomplished as described for FIG. 13. The "top side" of the frame 20 in this example, as in the previous example, comprises slats 43 and 59. The large shaded arrow pointing downwards in FIG. 14 represents motion of the top side of the frame 20 in the vertical direction. The large shaded arrow pointing rightwards represents motion of the left side of the frame 20 in the horizontal direction. Notice how the clips of the clip pairs 21 and 22, being attached to the various sides of the frame, are effectively moved towards each other as the sides are contracted, thus enabling the frame 20 to snugly accommodate a smaller tablet PC or other device inside of it in a finely adjustable and continuously adjustable manner.

Any of the various embodiments shown herein may borrow from any of the others, such that any of the various mounting means 11, adjustment means 14, types of cordage 15, arrangement of clip pairs 21, 22, 23, or 24, and methods for adjusting dimensions of the frame 20, for example, may be combined within any one embodiment of the apparatus 100.

Although one specific example of an adjustable frame 20 is illustrated in the drawings herein, any of the methods known in the art for constructing an adjustable four-sided frame are contemplated for use in the present invention.

It should be emphasized that the above described embodiments of the present invention exemplify some, but not all, possible implementations of the present invention and have been set forth in order to provide a clear understanding of its qualities. Those skilled in the art will appreciate that the conception upon which this disclosure is based may readily be utilized as a basis for designing of other structures, methods, and systems for carrying out the several purposes of the present invention. The following claims should be regarded as encompassing equivalent and various constructions insofar as they do not depart from the spirit and scope of the methods and devices consistent with the present invention.

What is claimed is:

1. An apparatus for mounting a tablet personal computing device, the apparatus comprising:
   a mounting means connected to a hanger by a connector element, wherein the hanger is a rod and wherein said connector element comprises means for holding the rod such that the rod is rotatable about its longitudinal axis,
   cordage descending vertically from the rod and attaching to a four-sided frame, said cordage having an effective length corresponding to a distance between the hanger and the frame,
   an adjustment means for adjusting the effective length of the cordage, the adjustment means being attached to an end portion of the cordage,
   at least one horizontally oriented pair of clips, comprising two opposing horizontal clips, for holding the tablet personal computing device between them, said horizontally oriented pair of clips being attached on opposite lateral sides of the frame,
   at least one vertically oriented clip for supporting a bottom edge of the tablet personal computing device, said vertically oriented clip being attached to the bottom side of the frame, and,
   one or a plurality of stabilizers attached to a rear surface of the frame.

2. The apparatus of claim 1, further comprising a tensioning element that alternatively prevents and allows adjustment of the adjustment means, wherein the tensioning element comprises a screw passing through the connector element such that tightening said screw imparts a force that impinges upon a portion of the rod such that the rotatability of the rod is modulated.

3. The apparatus of claim 1, further comprising a versatile stabilizer attachment means for reversibly attaching said stabilizers to a rear surface of the frame, wherein the versatile stabilizer attachment means comprises an extruded channel for receiving an attachment feature on one or a plurality of said stabilizers.

4. The apparatus of claim 1, wherein the adjustment means is attached to the hanger.

5. The apparatus of claim 1, wherein the length of one or more sides of the frame is adjustable.

6. The apparatus of claim 1, wherein the mounting means is a suction cup assembly.

7. An apparatus for mounting a tablet personal computing device, the apparatus comprising:
   a mounting means connected to a hanger,
   cordage descending vertically from the hanger and attaching to a four-sided frame, said cordage having an effective length corresponding to a distance between the hanger and the frame, an adjustment means for adjusting the effective length of the cordage, the adjustment means being attached to an end portion of the cordage, a tensioning element that alternatively prevents and allows adjustment of the adjustment means, wherein the tensioning element is a thumbscrew, at least one horizontally oriented pair of clips, comprising two opposing horizontal clips, for holding the tablet personal computing device between them, said horizontally oriented pair of clips being attached on opposite lateral sides of the frame, at least one vertically oriented clip for supporting a bottom edge of the tablet personal computing device, said vertically oriented clip being attached to the bottom side of the frame, and, one or a plurality of stabilizers attached to a rear surface of the frame.

8. An apparatus for mounting a tablet personal computing device, the apparatus comprising:

a mounting means connected to a hanger, cordage descending vertically from the hanger and attaching to a four-sided frame, said cordage having an effective length corresponding to a distance between the hanger and the frame, an adjustment means for adjusting the effective length of the cordage, the adjustment means being attached to an end portion of the cordage, at least one horizontally oriented pair of clips, comprising two opposing horizontal clips, for holding the tablet personal computing device between them, said horizontally oriented pair of clips being attached on opposite lateral sides of the frame, at least one vertically oriented clip for supporting a bottom edge of the tablet personal computing device, said vertically oriented clip being attached to the bottom side of the frame, and, one or a plurality of stabilizers attached to a rear surface of the frame, a versatile stabilizer attachment means for reversibly attaching said stabilizers to a rear surface of the frame, wherein the versatile stabilizer attachment means comprises an extruded channel for receiving an attachment feature on one or a plurality of said stabilizers.

* * * * *